United States Patent Office 3,453,538
Patented July 1, 1969

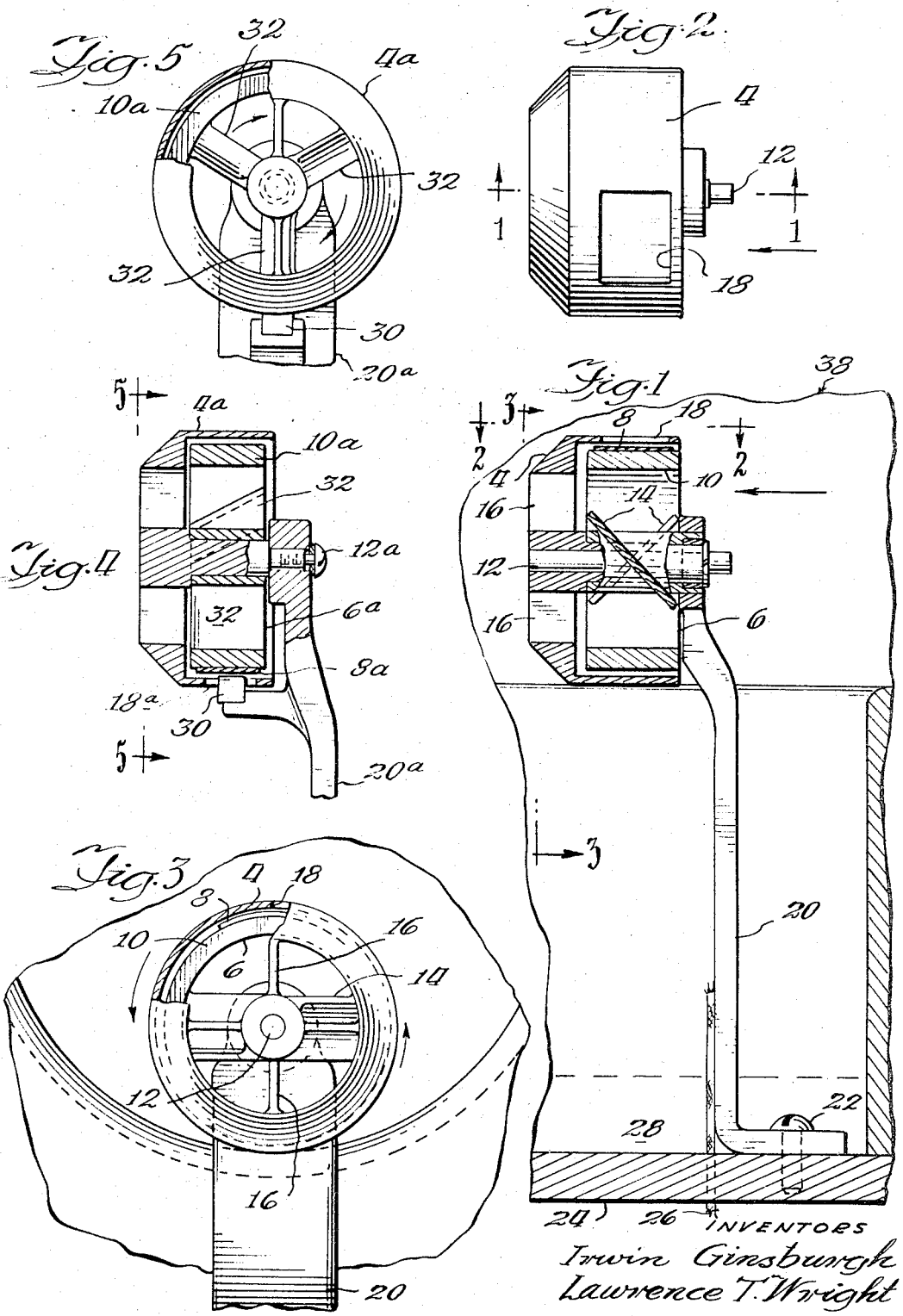

3,453,538
TURBINE APPARATUS FOR MEASURING THE ELECTROSTATIC CHARGE DENSITY IN ELECTRICALLY CHARGED FLOWING FLUIDS
Lawrence T. Wright, Homewood, and Irwin Ginsburgh, Morton Grove, Ill., assignors to Standard Oil Company, Chicago, Ill., a corporation of Indiana
Filed Nov. 29, 1966, Ser. No. 597,590
Int. Cl. G01r 31/02
U.S. Cl. 324—72      10 Claims

ABSTRACT OF THE DISCLOSURE

The apparatus disclosed herein detects and measures the magnitude of the space density of electrostatic charge in an electrically charged flowing fluid. The apparatus operates on the principal of charge induction and utilizes the flowing fluids as a source of rotative power. In one embodiment, the apparatus comprises a hollow stationary inner cylinder having an electrostatic charge induction means fixed thereon. The inner cylinder is coaxially surrounded by a rotatable electrically grounded hollow outer cylinder. The outer cylinder is provided with apertures for alternately exposing and shielding the induction means. In this embodiment the outer cylinder may be provided with rib means and the inner with fluid deflection means which deflects the flowing fluids against the rib means causing rotation of the outer cylinder and causing an electrostatic charge to be induced on the electrostatic charge induction means. The charge so induced is proportional to the space density of charge in the fluids, and the relative rotation of the cylinders produces a signal which is converted into meaningful form by the measuring means.

---

This invention relates to an improved electrical measuring apparatus, and more particularly, to a new and improved charge density meter for measuring the space or charge density of charge contained in electrically charged flowing fluids.

When fluids of low conductivity are moved through a transfer system, electrical charges are generated in the fluids which may produce high potential differences between various sections of the transfer system and between the fluid and its surroundings. Such high potential differences may produce electrical discharges which may release sufficient energy to cause ignition of a flammable gaseous mixture. Hazardous situations may therefore arise during, and within a short period of time after, the transfer to previously empty or partially filled vessels of certain materials which are of low electrical conductivity and which can form explosive mixtures with air, as is the case with many petroleum products. This may also be the case when such materials are pumped into vessels which contained rich mixtures which can become flammable by reason of the incoming fluid. It is important, therefore, to have a device which can accurately and reliably measure the density of charge in said fluids during their movement through a transfer system. Likewise, it is important to have a device which may be used in conjunction with a charge neutralizing chamber such as the one invented by Ginsburgh and disclosed in a copending application. In such a system it would be possible to provide a constant check on the effectiveness of the chamber in neutralizing the charge contained in the fluid.

Basically, as is known in the art, these meters operate on the conventional principle of the generating voltmeter. That is, the electric field of the charged fluid is measured by measuring the induced electric charge on an electrode or sensing element which has been exposed to or immersed in the charged fluid and which has been insulated from ground and its surroundings. Most commonly this is accomplished by alternately exposing and shielding the sensing element from the charged fluid thus causing a charge to be alternately induced on and forced off the sensing element. The charge so induced is proportional to the charge or space density of charge contained in the electrically charged fluid. The electrode or sensing element should be so disposed as to minimize geometric alterations in the field which is to be measured.

The charge density meter of this invention measures the charge or space density of charge contained in electrically charged flowing fluids. There are prior art meters which will measure the space density of such fluids. However, there are certain disadvantages which are inherent in these prior art meters. Chief among these disadvantages are the rather complex constructional features of the prior art devices and the fact that the prior art devices require a source of rotative power, such as an electric motor, in order to alternately expose and shield the electrode or sensing element from the charged fluid.

It has now been discovered that these disadvantages may be eliminated or substantially reduced through the utilization of the charge density meter in accordance with this invention. The meter of this invention has relatively simple constructional features, and yet does not require a source of rotative power.

Briefly stated, the apparatus of this invention is a charge density meter for detecting and measuring the magnitude of the space density of charge in electrically charged flowing fluids which comprises: a hollow stationary inner cylinder; an electrostatic charge induction means fixed in electrically insulating relationship to the outer surface of the inner cylinder; a fluid rotatable electrically grounded hollow outer cylinder coaxially surrounding the inner cylinder and in close proximity to the electrostatic charge induction means, the outer cylinder having aperture means for alternately exposing and shielding the electrostatic charge induction means from the flowing fluids as the outer cylinder is rotated by the flowing fluids whereby an electrostatic charge is induced on the electrostatic charge induction means, the electrostatic charge induced being proportional to the space density of charge in the fluids; and measuring means capacitor shunted to the electrostatic charge induction means, the measuring means being adapted to measure the magnitude of the induced electrostatic charge. The outer cylinder may be provided with fluid turbine means adapted to contact the flowing fluids and cause rotation of the outer cylinder. In still a different embodiment the inner cylinder may be provided with fluid deflection means and the outer cylinder may be provided with rib means, the deflection means being adapted to deflect the flowing fluids against the rib means and cause rotation of the outer cylinder.

In another aspect of this invention, the meter may be so constructed that the inner cylinder is fluid rotatable while the outer cylinder is stationary. In this aspect of the invention a charge removal means, such as a brush and slip ring arrangement is used in order to remove the induced charge from the electrostatic charge induction means. The fluid turbine means or the fluid deflection and rib means may also be utilized in this aspect of the invention.

In still another aspect of this invention a phase sensing circuitry may be used in combination with the charge density meter. If the apparatus of this invention was to be used, as mentioned above, in conjunction with a charge neutralizing chamber and was positioned immediately downstream of the neutralizing chamber a phase sensing circuitry must be provided because the action of the neutralizing chamber will be such that although the fluids leaving the neutralizing chamber will be electrically neutralized on a large scale it will carry small quantities of unmixed charges of both sign. This will be explained in detail in the discussion accompanying FIGURE 6.

The full nature of the invention will be understood from the accompanying drawings and the following description and claims.

FIGURE 1 is a cross-sectional elevation view taken along the longitudinal axis of one embodiment of the apparatus of this invention.

FIGURE 2 is a plan view of the embodiment of FIGURE 1 taken along line 2—2 of FIGURE 1.

FIGURE 3 is a side view of the embodiment depicted in FIGURE 1 taken along line 3—3 of FIGURE 1.

FIGURE 4 is a cross-sectional elevation view of another embodiment of the apparatus of this invention.

FIGURE 5 is a side view of the embodiment depicted in FIGURE 4 taken along line 5—5 of FIGURE 4.

Figure 6:
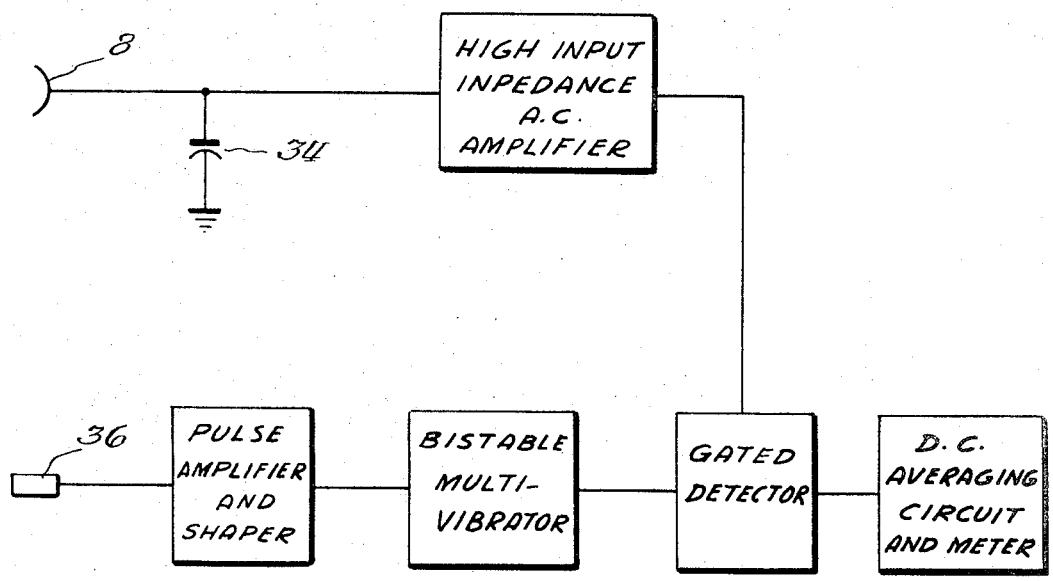
FIGURE 6 is a block diagram of one embodiment of the phase sensing circuitry which may be utilized in combination with the apparatus of this invention.

The invention is illustrated by one embodiment thereof in FIGURES 1, 2, and 3. In FIGURE 1 a cross-sectional elevation view taken along the longitudinal axis of charge density meter 2 is shown. As will be seen from the description to follow, the meter is so constructed as to be positioned within a transfer system and derive its source of rotative power from the flowing fluids. The meter, in this embodiment, comprises hollow stationary inner cylinder 6 coaxially surrounded by hollow rotatable outer cylinder 4. Both inner cylinder 6 and outer cylinder 4 are open at each end. The outer surface of inner cylinder 6 is surrounded by insulating material 10 which may conveniently be a polyvinylchloride ring or like material. Fixed to insulating material 10 is electrostatic charge induction means 8. A copper plate may be used for the charge induction means and it may be fastened to insulating material 10 by any convenient fastening means, preferably by screws secured to the insulating material. Outer cylinder 4 is coaxially and rotatably positioned around inner cylinder 6 by means of shaft arrangement 12. Outer cylinder 4 is provided with aperture or window 18 which is positioned in alignment with electrostatic charge induction means 8.

In the embodiment described in FIGURES 1, 2, and 3, inner cylinder 6 is provided with fluid deflection means 14. The deflection means may be positioned across the inside diameter of inner cylinder 6 as shown in FIGURE 3. Outer cylinder 4 is provided with rib means 16. In operation, fluid flowing as indicated by the arrow in FIGURE 1 contacts fluid deflection means 14 and deflects the fluid against rib means 16. The force of the deflected fluid against the rib means causes outer cylinder 4 to rotate. Of course it is necessary that the velocity of the fluid be of sufficient magnitude to generate enough force against rib means 16 after deflection, to cause rotation of the outer cylinder. As illustrated in FIGURE 3, rib means 16 may be positioned across the internal diameter of outer cylinder 4 to the housing for shaft arrangement 12. Fluid deflection means 14 should be of sufficient pitch as to cause the deflected fluid and the turbulence created thereby to be at the area of the rib means in order to cause rotation.

In the embodiment depicted in FIGURE 1, meter 2 is shown mounted on an assembly arrangement for positioning the meter in a transfer system. The assembly arrangement comprises supporting member 20 which is fixed at the end of shaft 12. Supporting member 20 is fixed by means of fastener 22 to base 24. A standard flange is satisfactory for the base. The necessary electrical wiring 28 may be conveniently positioned on supporting member 20. One wire is connected to electrostatic charge induction means 8 and the other is grounded at the housing of shaft 12 in order to ground outer cylinder 4. The wires are then brought in contact with terminals 26 extending from base 24. From terminals 26 the meter may then be connected to an appropriate readout circuit as will be explained in the description to follow.

FIGURES 4 and 5 depict another embodiment of the apparatus of this invention. In this embodiment outer cylinder 4a is stationary and inner cylinder 6a rotates. This may be accomplished by positioning inner cylinder 6a on a shaft arrangement such as 12a. The other elements shown are the same as described above in reference to FIGURES 1, 2, and 3. This embodiment, however, utilizes a fluid turbine or pitched blade arrangement 32 positioned across the internal diameter of inner cylinder 6a. The flowing fluid contacts arrangement 32 and causes inner cylinder 6a to rotate. Either embodiment discussed will produce satisfactory results and either may be used. It is, however, necessary when the latter embodiment is used, to provide a means for removing the induced charge from charge induction means 8a. A convenient way of accomplishing this is to use brush and slip ring arrangement 30. The brush and slip ring may be positioned on supporting member 20a as illustrated, so that the brush will contact electrostatic charge induction means 8a as it is exposed by window 18a. The instrument may then be wired in the manner described above.

As explained above, the charge density meter of this invention operates on the principal of electrostatic induction. In essence, the meter comprises a sensing electrode (charge induction means 8) and a shielding electrode (outer cylinder 4 provided with aperture 18) which rotates about the sensing electrode. Of course in the alternative embodiment illustrated in FIGURES 4 and 5, the sensing electrode is rotated and the shielding electrode is stationary. While the discussion to follow will be confined to the first embodiment, the principal of operation in either case is the same.

When the shielding electrode is in front of the sensing electrode, the shielding electrode prevents the electric field of the charged fluids from reaching the sensing electrode. There is no signal from the electrode at this time. As this shielding electrode rotates the aperture passes the sensing electrode and exposes it to the electric field of the charged fluids, electric charges are then attracted by induction. These charges are induced from ground through a sensing resistor (not shown) to the sensing electrode. This flow of charges generates a voltage across the sensing resistor and constitutes the outward voltage of the charge density meter. When the aperture fully exposes the sensing electrode or when the shielding electrode has been completely removed from the sensing electrode, this flow of charge stops. As the shielding electrode starts to cover the sensing electrode, these charges are now forced to return to ground through the sensing resistor and they generate a voltage of the opposite sign. If the charge of the flowing fluid was of the opposite sign, then the sign of the generated voltage would be opposite also, so that a 180° phase shift in generated signal occurs due to a change in the sign of the charge in the fluids.

If the meter is to be used to monitor a transfer system or is used upstream of a charge neutralizing chamber, a simple A.C. voltmeter may be used to read the output of the meter. It is desirable, however, to shunt the output signal from the sensing electrode with a capacitor in order to make the calibration of the device relatively insensitive to reasonable changes in the rotational speed of the shielding electrode.

While it is necessary to calibrate the meter for each installation in a different size transfer system, once it is calibrated for a given size transfer system it will not be necessary to recalibrate for that size. The calibration is made by determining the output voltage when charged fluid of a known space charge density flows by a point at a known velocity. This, then determines what space charge density the meter is exposed to in this particular system.

Figure 7:
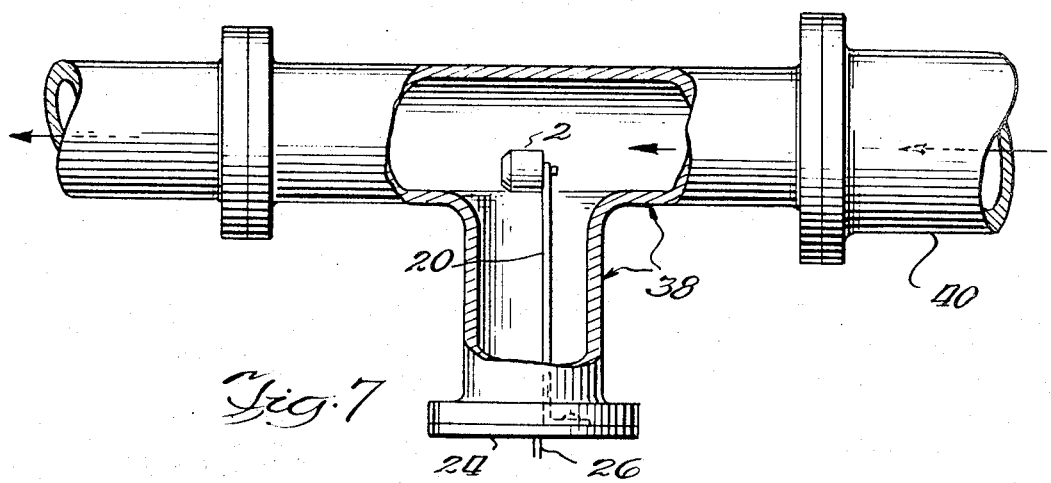
FIGURE 7 is a sectional view of one embodiment of the assembly arrangement for positioning the apparatus of this invention in a transfer system.

If the charge density meter is used immediately downstream of a charge neutralizing chamber, or as will be illustrated in FIGURE 7, in a package arrangement with a neutralizing chamber, a simple A.C. voltmeter may not be used as the measuring device. Because of the action of the neutralizing chamber, fluid which leaves the chamber will be neutralized . . . (see above). While the over-all average value of charge can be very close to zero, the instantaneous charge density exposed to the meter may not be. Since the charge density meter receives a signal, the size of which is proportional to the quantity of charge contained in the oil, the charge density meter puts out a voltage the amplitude of which is proportional to the quantity of charge present. A change in the sign of a charge will produce a change in the phase of the output signal but will not produce a change in the amplitude. Thus, unless one is able to sense this change in phase, it may be assumed that a high charge density exists when in fact a very low charge density exists. In order to detect the change in this phase of the output signal, a reference signal must be obtained. FIGURE 6 illustrates one possible embodiment for accomplishing this.

In FIGURE 6 a block diagram of the necessary circuitry is shown. This system utilizes reference signals sensing means 36 which may be a conventional magnetic proximity probe or pickup. Sensing means 36 is positioned on the charge density meter in such manner as to sense each time the edge of aperture 18 begins to cover or uncover the sensing electrode. The output from reference sensing means 36 emits a signal of one sign when the aperture starts to open and a signal of the opposite sign when the aperture starts to clost. The phase or the direction of this signal will not change with a change in amplitude or sign of the charge density; therefore, this provides an arcuate phase reference signal. The output signal from sensing electrode 8 is shunted by condenser 34. The purpose of this condenser as explained in reference to the use of a simple A.C. voltmeter is to render the calibration of the meter relatively insensitive to reasonable changes in rotational speed. The signal from sensing electrode 8 then goes into the high input impedance A.C. amplifier. The high input impedance is required in order to prevent degradation of the amplitude of the signal coming from the sensing electrode.

A second signal, from sensing means 36, goes into the pulse amplifier and shaper. This amplifies the pulses from the sensing means 36 and gives them sharp leading edges. These pulses then go into the bi-stable multivibrator. This device has two positions of stability. It is capable of sensing the direction of pulses and will respond only to a positive pulse. When a positive pulse is present, this device will be triggered into a second stable position. In this second stable position it will be triggered only by a negative pulse and it will then return to its initial state. In its initial state output voltage from this vibrator is used to close or bias off the gated detector. There is a second input into this gated detector which comes from the A.C. amplifier which is amplifying the electrostatic induction signal. Normally, there is no output from the gated detector until a posiitve pulse triggers the bi-stable multi-vibrator. At this point the gated detector is turned on and it sends through the signal coming from the A.C. amplifier. When a negative pulse occurs, the bi-stable multi-vibrator is shut off, and the gated detector is also closed. The signal to the D.C. averaging circuit and meter, or integrating circuit, will then have an amplitude which is proportional to the quantity of charge in the fluids and it will have a sign which depends upon the sign of the charge, that is, a positive signal will correspond to positively charged fluids and a negative signal will correspond to negatively charged fluids or vice versa depending on fixed phase shifts in the circuitry. Even though the sign of the fluids moving through the transfer system is changing sign quite rapidly, this circuit will provide an output voltage whose sign also changes; and, therefore, the D.C. averaging circuit will give an average reading which would be a true indication of the resulting charge density. The detail circuitry utilized for the phase sensing aspect of this invention is commercially available and would be known to one skilled in the art. Either vacuum tube or transistor technology may be used.

FIGURE 7 illustrates one mannner in which the meter of this invention may be installed in a transfer system. Meter 6 is shown mounted in standard pipe T 38. Base 24 is conveniently flanged to the T. Support 20 should be so constructed so that the bottom surface of the outer cylinder is approximately tangent to the bottom wall of the pipe.

FIGURE 7 also illustrates one manner in which the meter may be installed in a package arrangement with a charge neutralizing chamber. Chamber 40 would be placed in the transfer system with meter 2 immediately downstream of the chamber in order to monitor the effectiveness of the neutralization occurring in the chamber.

From the foregoing description and from the accompanying drawings it will be seen that the present invention provides an improved charge density meter which has simple constructional features and which does not require an external source of rotative power, and yet, will accurately and reliably measure the charge or space density of flowing fluids.

The invention claimed is:

1. Apparatus for detecting and measuring the magnitude of the space density of charge in electrically charged flowing fluids, said apparatus comprising:
   (a) a hollow stationary inner cylinder open at each end;
   (b) electrostatic charge induction means fixed in electrically insulating relationship to the outer surface of said inner cylinder;
   (c) a fluid rotatable electrically grounded hollow outer cylinder open at each end coaxially surrounding said inner cylinder and in close proximity to said electrostatic charge induction means, said outer cylinder being provided with aperture means adapted to alternately expose and shield said electrostatic charge induction means from said flowing fluids as said outer cylinder rotates;
   (d) rib means in fixed relationship to said outer cylinder;
   (e) fluid deflection means in fixed relationship to said inner cylinder, said fluid deflection means being adapted to deflect said flowing fluids against said rib means and cause rotation of said outer cylinder, whereby an electrostatic charge is induced on said electrostatic charge induction means as said electrostatic charge induction means is alternately exposed and shielded from said flowing fluids; and (f) measuring means capacitor shunted to said electrostatic charge induction means, said measuring means being adapted to measure the magnitude of said electrostatic charge, the magnitude of said electrostatic charge being proportional to the magnitude of the space density of charge in said fluids.

2. The apparatus of claim 1 wherein said measuring means comprises:

(a) reference signal sensing and generating means adapted to sense said shielding and exposing of said electrostatic charge induction means by said outer cylinder, and further adapted to generate reference signals of one sign at said shielding and of opposite sign at said exposing, said reference signals being independent of changes in the magnitude and sign of the space density of said flowing fluids;

(b) high input impedance A.C. amplifier means capacitor shunted to said electrostatic charge induction means, said amplifier means being adapted to amplify and maintain the amplitude of the signals from said electrostatic charge induction means, said signals being proportional to said electrostatic charge induced on said electrostatic charge induction means; and (c) circuit means electrically connected to said reference signal sensing and generating means, said circuit means being adapted to gate said signals from said electrostatic charge induction means with said reference signals whereby charge in said flowing fluids of positive sign produces an output signal from said circuit means of one sign and charge in said flowing fluids of negative sign produces an output signal from said circuit means of opposite sign; and (d) averaging means electrically connected to said circuit means said averaging means being adapted to average said output signals from said circuit means, the resultant sum being proportional to the net space density of charge in a volume of said flowing fluids.

3. Apparatus for detecting and measuring magnitude of the space density of charge in electrically charged flowing fluids, said apparatus comprising:

(a) a fluid rotatable hollow inner cylinder open at each end;

(b) electrostatic charge induction means fixed in electrically insulating relationship to the outer surface of said inner cylinder;

(c) a hollow stationary electrically grounded hollow outer cylinder open at each end coaxially surrounding said inner cylinder and in close proximity to said electrostatic charge induction means, said outer cylinder being provided with aperture means adapted to alternately expose and shield said electrostatic charge induction means from said flowing fluids as said inner cylinder rotates;

(d) rib means in fixed relationship to said inner cylinder;

(e) fluid deflection means in fixed relationship to said outer cylinder, said fluid deflection means being adapted to deflect said flowing fluids against said rib means and cause rotation of said inner cylinder whereby an electrostatic charge is induced on said electrostatic charge induction means as said electrostatic charge induction means is alternately exposed and shielded from said flowing fluids;

(f) charge removal means positioned to electrically contact said electrostatic charge induction means and adapted to remove said electrostatic charge from said electrostatic charge induction means;

(g) measuring means capacitor shunted to said charge removal means, said measuring means being adapted to measure the magnitude of said electrostatic charge, the magnitude of said electrostatic charge being proportional to the magnitude of the space density of charge in said fluids.

4. The apparatus of claim 3 wherein said charge removal means comprises a brush and slip ring.

5. The apparatus of claim 3 wherein said measuring means comprises:

(a) reference signal sensing and generating means adapted to sense said shielding and exposing of said electrostatic charge induction means by said outer cylinder, and further adapted to generate reference signals of one sign at said shielding and of opposite sign at said exposing, said reference signals being independent of changes in the space density of said flowing fluids;

(b) high input impedance A.C. amplifier means capacitor shunted to said electrostatic charge induction means, said amplifier means being adapted to amplify and maintain the amplitude of the signals from said electrostatic charge induction means, said signals being proportional to said electrostatic charge induction means; and (c) circuit means electrically connected to said reference signal sensing and generating means, said circuit means being adapted to gate said signals from said electrostatic charge induction means with said reference signals whereby charge in said flowing fluids of positive sign produces an output signal from said circuit means of one sign and charge in said flowing fluids of negative sign produces an output signal from said circuit means of opposite sign; and (d) averaging means electrically connected to said circuit means, said averaging means being adapted to average said output signals from said circuit means, the resultant sum being proportional to the net space density of charge in a volume of said flowing fluids.

6. An apparatus for measuring the magnitude of the space density charge in a charged flowing fluid comprising:

(a) first and second cylinder means coaxially mounted proximate each other for relative rotation;

(b) means coupled to the second cylinder means for connecting said second cylinder means to ground;

(c) electrostatic charge induction means between said first and second cylinder means and fixed in electrically insulating relationship to the surface of the first cylinder means;

(d) aperture means in the second cylinder means adapted to alternately shield and expose said electrostatic charge induction means to said chrage fluid as said cylinder means revolve relative to each other, whereby said electrostatic charge induction means alternately charges and discharges;

(e) fluid turbine means mounted on one of said cylinder means, said fluid turbine means incluing a pitched element disposed in the path of the flowing fluid and aligned in a predetermined position relative to the direction of flow of the fluid so that, as the fluid strikes said element, the fluid turbine means is actuated, causing relative rotation of said cylinder means; and (f) means coupled to the electrostatic charge induction means which respond to the charging and discharging of said induction means to provide a measurement of the space density of charge of said flowing fluid.

7. The apparatus of claim 6 wherein said first cylinder is inside said second cylinder and said fluid turbine means include pitched vane means affixed to the inner surface of the first cylinder disposed in the path of the flowing fluid and aligned in a predetermined position relative to the direction of flow so that, as the fluid strikes said vane means, the fluid is deflected against rib means affixed to the second cylinder causing relative rotation of said cylinder means.

8. The apparatus of claim 7 wherein said first cylinder is stationary.

9. The apparatus of claim 6 wherein said first cylinder is inside said second cylinder and said fluid turbine means include pitched blade means affixed to the inner surface of said first cylinder, said blade means disposed in the path of the flowing fluid and aligned in a predetermined position relative to the direction of flow so that fluid strikes said blade means and causes relative rotation of said first and second cylinders.

10. The apparatus of claim 9 wherein said second cylinder is stationary.

References Cited

UNITED STATES PATENTS

| 2,763,461 | 9/1956 | Hill | 253—65 XR |
| 2,980,855 | 4/1961 | Moore | 324—72 |
| 3,226,084 | 12/1965 | Kanger | 253—31 |

OTHER REFERENCES

Physical Review, "Principles of a New Portable Electrometer," (Ross Gunn), vol. 40, April 15, 1932, pp. 307–312.

RUDOLPH V. ROLINEC, *Primary Examiner.*

E. L. STOLARUN, *Assistant Examiner.*

U.S. Cl. X.R.

73—231; 317—246; 324—61